Patented Sept. 1, 1942

2,294,682

UNITED STATES PATENT OFFICE 2,294,682

METHOD OF MAKING NUT BUTTERS

Williamson W. Moss, Jr., St. Petersburg, Fla.

No Drawing. Application February 11, 1941,
Serial No. 378,441

7 Claims. (Cl. 99—128)

This invention relates to an improved peanut product in the nature of peanut butter, and also to similar products made from soya beans, peas, or other legumes. The invention also relates to the production of such products.

It is well known that peanut butter possesses a characteristic stickiness or tackiness, causing it to adhere to the mouth membranes or to the surface of a knife or spoon. This tacky characteristic is responsible in great part for the lack of popularity of peanut butter with many persons.

It is also well known that with ordinary peanut butter, there is a tendency of the oil content of the product to separate after the product has stood in the container for a period of time. As a result, the upper portion of the peanut butter contains an excess of oil, while the lower portion is so lacking in oil as to be generally undesirable as a food.

Attempts have been made to overcome this separation of the oil by a coarser grinding of the peanuts, by removal of a portion of the oil before packing, by the addition of glycerine or other materials to the peanut butter, or by keeping the product under continuous chilling conditions. However, none of these treatments has been successful.

The principal object of the present invention is to provide a peanut butter which is free from the tackiness characteristic of ordinary peanut butter.

An important object of the present invention is to provide an improved peanut butter in which the oil content is so conditioned that it does not separate from the peanut meal on standing.

Another object of the present invention is to provide an improved peanut butter in which the oil content of the product is in the form of an oil-in-water emulsion surrounding the peanut meal particles.

A further object of the present invention is to provide an improved peanut butter which is stiffer and firmer than other peanut butter prepared from peanuts ground to the same degree of fineness, whereby the product may be packed in the type of paper carton packages customarily used for packaging soft cheese products, creamery butter and the like.

Another object of the present invention is to provide a process of preparing an improved peanut butter having the above mentioned desirable characteristics.

Other objects and advantages of the invention will become apparent during the course of the following description.

While, as heretofore stated, the present invention is applicable to the production of vegetable butters from soya beans, peas and other legumes, the invention will be hereinafter described, for purposes of illustration, in connection with the production of peanut butter because of its relatively greater importance as a food product.

In its broad aspect, the present invention contemplates the usual preliminary preparation of the peanuts, the addition to an aqueous suspension thereof of a proteolytic enzyme, the grinding of the thus treated peanuts, the maintaining of the ground peanuts at an incubating temperature favorable to the proteolytic action of the enzyme present, and the subsequent pasteurization of the product to destroy the enzyme present. As will be apparent, the process is based on the action of a proteolytic enzyme for a few hours with a subsequent distraction of the added enzyme by subjecting the peanut butter under treatment to a pasteurizing temperature.

In commercial practice, I prefer to employ papain as the proteolytic enzyme. However, instead of papain, which is customarily obtained from the papaya fruit, other proteolytic enzymes may be used, such as bromelin. In addition, the proteolytic enzymes from the pineapple, banana, plantain, fig, mulberry, or similar sources may be used. However, papain is prefered because it is most readily and cheaply obtained and, also, because it can be had more readily in a more concentrated form.

Inasmuch as the presence of water with the proteolytic enzyme is essential for its action, a small amount of water is added with the enzyme. However, since the amount of added water is small, being but a part of the amount of water lost in the roasting process, the addition of water is not objectionable. On the contrary, additional amounts of water may be added to the peanut butter after the completion of the process in order to make the product softer, should this be desired.

Inasmuch as the activity of proteolytic enzymes is generally at a maximum in an aqueous medium having a pH of or slightly below 5, the water suspension of the peanuts containing the enzyme is adjusted, if necessary, to a pH of between 3.8 and 5.

If it is desired to increase the speed or the extent of the action of the proteolytic enzyme, this may be done by adding small amounts of amygdalin or glutathione or other organic thio compound. Moreover, this result may be obtained by adding fruit juices containing one or more of these activating agents to the water solution of the enzyme. For example, a small amount of pineapple juice may be added to the water solution of the enzyme for the purpose stated. However, I prefer to prolong the proteolytic action a few hours longer at incubating temperature, say at about blood temperature, 98° F., rather than to use these hastening agents.

After the peanut butter has been prepared in accordance with the present process, a softer product can be produced therefrom, if desired, by adding more peanut oil or, preferably, by adding additional water. Due to the character of the improved peanut butter, the consistency of the peanut butter is sufficiently stiff even though additional water is added so that the product may be packed in paper carton packages.

The following specific example of the practice of my process is illustrative of the invention:

Peanuts of desired variety are cleaned, shelled, the imperfect nuts removed, and the balance steamed, brushed, sifted to remove skin and embryos and then roasted and weighed. To 100 pounds of peanuts, one-tenth of an ounce of grade 1,000 papain (or one-half ounce of grade 200 papain—Mexican) suspended in a pint of water (adjusted to a pH of between 3.8 and 5) is added and the whole batch is stirred. If it is desired to impart a salty flavor to the peanut butter, one pound or more of salt may be added to the suspension.

The resulting suspension is then introduced into any suitable grinder for the purpose of grinding the peanuts to butter. Thereafter, the peanut butter is packed in sealed marketing containers which are immediately placed in an incubator maintained at a temperature of from 95° to 100° F. The packaged peanut butter is allowed to remain in the incubator for a sufficient period of time to effect the desired proteolytic activity of the enzyme. Ordinarily, the packaged peanut butter is allowed to remain in the incubator for about 24 hours. While the incubating temperature may vary from 80° to 130° F., I have found that the enzyme action is most rapid at a temperature of 95–100° F., that is, approximately blood temperatures.

After the peanut butter has been in the incubator for the desired period, the proteolytic action is then stopped and the enzyme present is destroyed by subjecting the peanut butter to a pasteurizing temperature, say 160–170° F., for about one hour. The pasteurizing temperatures may vary from about 160° F. to about 230° F., but a temperature in the neighborhood of 170° F. is preferred.

As a result of the above described treatment, the oil present in the peanut butter becomes the inner phase of an oil-water emulsion. Moreover, the improved peanut butter is stiffer and firmer than ordinary peanut butter prepared from peanuts which have been ground to the same fineness. Thus, although additional water may be added to the improved peanut butter, the consistency will be sufficiently stiff so that the product may be packed in paper carton packages of the type customarily used for packing soft cheese products, creamery butter and the like. This is an important commercial advantage inasmuch as the expensive glass containers customarily used for packaging peanut butter need not be employed.

The improved peanut butter has the further advantage that, while the flavor is not changed, the separation of the oil from the butter is prevented and the tacky characteristics of ordinary peanut butter are eliminated.

The preparation of vegetable butters from other legumes such as soya beans, peas and the like may be effected in the same general manner as described above in connection with the manufacture of peanut butter.

While I have described in detail the preferred practice of my process it is to be understood that the details of procedure may be variously modified without departing from the spirit of the invention or the scope of the subjoined claims.

I claim:

1. In a method of preparing peanut butter and similar legume food products wherein the legume is converted into a butter, the improvement which comprises subjecting the butter in the presence of water to the action of a proteolytic enzyme at an incubating temperature, and thereafter destroying said enzyme.

2. In a method of treating legumes wherein the legumes are roasted and ground into a butter, the improvement for substantially preventing tackiness of such butter which comprises subjecting the roasted, ground legume in the presence of water to the action of proteolytic enzyme.

3. In a method of treating legumes wherein the legumes are roasted and ground into a butter, the improvement for preventing the tendency of the legume oil to separate from the butter which comprises subjecting the roasted, ground legume in the presence of water to the action of a proteolytic enzyme, and subsequently treating the product to destroy said enzyme.

4. The method of preparing peanut butter which comprises grinding roasted peanuts into a butter, subjecting the butter in the presence of water to the action of a proteolytic enzyme, and thereafter treating the resulting peanut butter to destroy said enzyme.

5. The method of preparing peanut butter which comprises grinding roasted peanuts into a butter, subjecting the ground product in the presence of water to the action of a proteolytic enzyme at an incubating temperature, and thereafter subjecting the product to a pasteurizing temperature to destroy said enzyme.

6. The method of preparing peanut butter which comprises grinding roasted peanuts into a butter, subjecting the ground product in the presence of water to the action of a proteolytic enzyme at a temperature of from 80° to 130° F., and thereafter destroying said enzyme by pasteurization of the product at a temperature of from 160° to 230° F.

7. The method of preparing peanut butter which comprises grinding roasted peanuts in the presence of an aqueous solution of a proteolytic enzyme having a pH value between 3.8 and 5, maintaining the resulting product at a temperature about 95–100° F. for approximately twenty-four hours, and thereafter pasteurizing the product at a temperature in the neighborhood of 170° F.

WILLIAMSON W. MOSS, Jr.